United States Patent
Perkins et al.

(10) Patent No.: US 10,338,995 B2
(45) Date of Patent: Jul. 2, 2019

(54) END TO END FPGA DIAGNOSTICS FOR A SAFETY SYSTEM

(71) Applicant: Artesyn Embedded Computing, Inc., Tempe, AZ (US)

(72) Inventors: Gary Perkins, Clay Springs, AZ (US); Malcolm J. Rush, Phoenix, AZ (US); Martin Peter John Cornes, Phoenix, AZ (US); Andrew Porter, Phoenix, AZ (US); Rajesh Mangal, Gilbert, AZ (US)

(73) Assignee: Artesyn Embedded Computing, Inc., Tempe, AZ (US)

( * ) Notice: Subject to any disclaimer, the term of this patent is extended or adjusted under 35 U.S.C. 154(b) by 203 days.

(21) Appl. No.: 15/456,034

(22) Filed: Mar. 10, 2017

(65) Prior Publication Data

US 2018/0260272 A1   Sep. 13, 2018

(51) Int. Cl.
| | |
|---|---|
| *G06F 11/00* | (2006.01) |
| *G06F 11/07* | (2006.01) |
| *G06F 11/16* | (2006.01) |
| *G06F 11/30* | (2006.01) |
| *G06F 11/20* | (2006.01) |

(52) U.S. Cl.
CPC ...... *G06F 11/0796* (2013.01); *G06F 11/0739* (2013.01); *G06F 11/1641* (2013.01); *G06F 11/2033* (2013.01); *G06F 11/3055* (2013.01); *G06F 11/2097* (2013.01)

(58) Field of Classification Search
CPC ............ G06F 11/3055; G06F 11/0739; G06F 11/0796; G06F 11/0751; G06F 11/1637; G06F 11/277; G06F 11/3013
See application file for complete search history.

(56) References Cited

U.S. PATENT DOCUMENTS

| | | | | |
|---|---|---|---|---|
| 2006/0259809 | A1* | 11/2006 | Mishra ................. | G06F 21/552 714/4.4 |
| 2013/0227648 | A1* | 8/2013 | Ricci ..................... | G06F 3/0484 726/3 |
| 2015/0171893 | A1* | 6/2015 | Vaananen .............. | G06F 11/10 714/819 |
| 2015/0193341 | A1* | 7/2015 | Ye .......................... | G06F 9/522 711/202 |
| 2015/0293806 | A1* | 10/2015 | Cornes ................. | B60T 13/665 714/47.1 |

* cited by examiner

*Primary Examiner* — Charles Ehne
(74) *Attorney, Agent, or Firm* — Harness, Dickey & Pierce, P.L.C.

(57) ABSTRACT

A system includes a first fail-safe chassis (FSC) receives module health signals from a plurality of modules and generates a first chassis health signal. The chassis health signal includes first and second portions. A plurality of modules receives the chassis health signal. The FSC determines whether one or more of the module heals signals indicates an associated module is unhealthy by comparing the module health signals and a predetermined health value. The FSC selectively de-asserts the first chassis health signal based on the comparison. A second FSC operates similarly. A safety relay box determines the health of the system in accordance with the first and second chassis health signals.

27 Claims, 3 Drawing Sheets

US 10,338,995 B2

END TO END FPGA DIAGNOSTICS FOR A SAFETY SYSTEM

FIELD

The present disclosure relates to fault-tolerant failsafe computer systems.

BACKGROUND

This section provides background information related to the present disclosure which is not necessarily prior art.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A safety application, such as a railway system, may include fault-tolerant failsafe computer systems configured to maintain safe operation of the safety application. The fault-tolerant failsafe computer systems may include a plurality of hardware and software components configured to control operation of safety critical hardware and software associated with the safety application. The safety critical hardware and software are configured to control safety relevant functions of the safety application.

For example, a train riding on the railway system includes a braking system. The braking system is configured to implement at least one safety relevant function, such as a braking function. The braking system includes at least a brake and software configured to actuate the brake. The software receives instructions to actuate the brake. For example, an operator of the train may operate a braking system user interface in order to instruct the software to actuate the brake. Periodically, an erroneous instruction to actuate the brake may be generated by a faulty component of the railway system. Accordingly, a fault-tolerant failsafe computer system configured to validate instructions received by external safety systems is desired.

SUMMARY

This section provides a general summary of the disclosure, and is not a comprehensive disclosure of its full scope or all of its features.

A first fail-safe chassis (FSC) receives a plurality of module health signals from a plurality of associated modules and continuously generates a first chassis health signal including a first portion indicating the health of the chassis and a second portion indicating a test request, wherein a plurality of modules in the system that each receive the chassis health signal. The first FSC also determines whether one or more of the module health signals indicates that an associated module is unhealthy based on a first comparison between each of the module health signals and a predetermined health value. The first FSC selectively de-asserts a first chassis health signal based on the first comparison. A second FSC receives a plurality of module health signals from a plurality of associated modules and continuously generates a second chassis health signal that contains a first portion indicating the health of the chassis and a second portion indicating a test request, wherein a plurality of modules in the system each receive the chassis health signal. The second FSC also determines whether one or more of the module health signals indicates that an associated module is unhealthy based on a second comparison between the module health signals and the predetermined health value. The FSC also selectively de-asserts the first chassis health signal based on the second comparison. A safety relay box module determines whether to instruct the first FSC to operate in a predetermined mode based on the first chassis health signal and the second chassis health signal.

A method includes receiving, by a fail-safe chassis (FSC) that generates a chassis health signal, a plurality of module health signals from a plurality of associated modules. The method includes determining whether one or more of the module health signals indicates that an associated module is unhealthy based on the first comparison between each of the module health signals and a predetermined health value. The chassis health signal is de-asserted based on the first comparison. The method determines by a safety relay box, whether to instruct the FSC to operate in a predetermined mode based on the chassis health signal and another chassis health signal.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
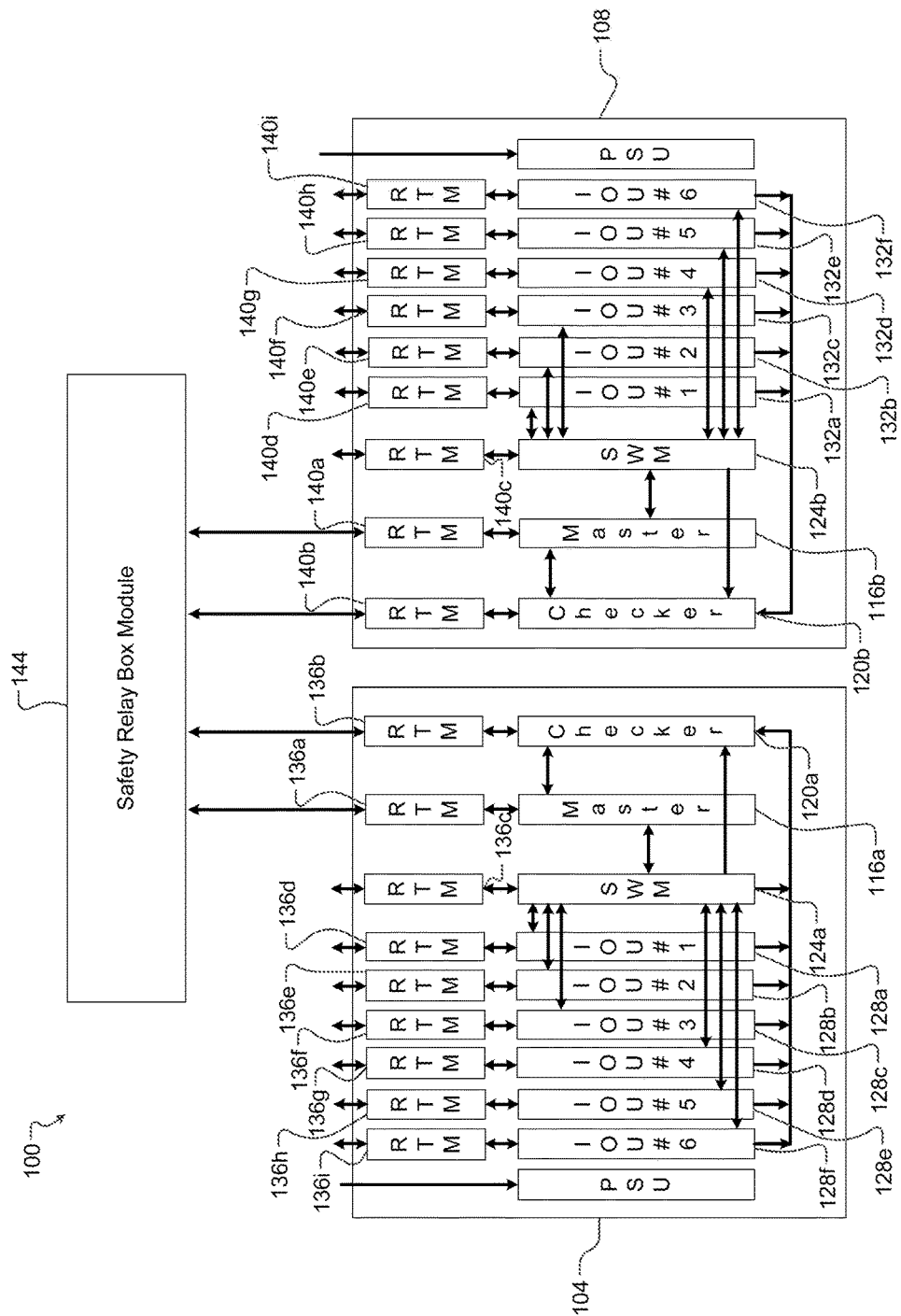
FIG. 1 is a functional block diagram of a fault-tolerant failsafe computer system according to the principles of the present disclosure.

Referring now to FIG. 1, a functional block diagram of an exemplary fault-tolerant failsafe computer system is shown generally at 100. The system 100 is configured to interact with various safety applications (SAs) and/or safety critical systems (SCSs). An SA may comprise a plurality of SCSs interacting and communicating with one and other in order to execute the SA. One example of an SA includes, by way of non-limiting example, a railway system. The railway system includes a plurality of SCSs.

The plurality of SCSs includes, but is not limited to, systems associated with a train operating on the railway system. The systems associated with the train may include a braking system, an acceleration system, an alarm system, and/or any other suitable systems associated with the train. The system 100 controls various components of the various SAs and/or SCSs, such as the railway system. The various components include portions of the SAs and SCSs that affect the safety of the SAs and SCSs. These components may be referred to as safety relevant components and may include safety critical hardware and software. By way of non-limiting example, the safety relevant components include components of the braking system, such as a brake and software configured to control the brake.

The safety critical hardware and software receive data elements from the SAs and/or SCs. For example, an operator of the train may desire to apply the brake of the train. The operator interacts with an operator interface, such as by actuating a brake lever. In response to actuating the brake lever, a signal is generated and communicated to safety critical hardware and software that control operation of the braking system The system 100 cooperatively operates with the safety critical hardware and software to ensure the components of the railway system, such as the brake, are operating safely. For example, the safety critical hardware and software communicate a data packet based on the brake lever signal. The system 100 validates the data packet. The safety critical hardware and software operate the braking system based on the validation. Other possible applications for the embodiments described herein include, but are not limited to, components of airline systems, components of medical treatment systems, components of oil and gas control systems, components of smart grid systems, and components of various manufacturing systems.

In some implementations, the system 100 receives a plurality of incoming data packets from an SA and/or a SCS, such as the railway system. The system 100 is configured to generate a plurality of outgoing data packets based on the plurality of incoming data packets and communicate the plurality of outgoing data packets to various safety relevant components of the SAs and/or SCSs. For example, as described in detail below, the system 100 determines whether a first packet of the plurality of incoming data packets is a valid packet. When the system 100 determines the first packet is a valid packet, the system 100 generates a first outgoing data packet based on the first packet and communicates the first outgoing data packet to at least one safety relevant component of the railway system.

The first incoming packet includes a plurality of data elements that control operation of the at least one safety relevant component. The data elements may include sensor data and/or input/output (I/O) point states. The at least one safety relevant component may be the train brake as described above. The plurality of data elements may also control operation of non-safety relevant components of the SA and/or SCS. The incoming data packets are communicated according to a transfer protocol. For example, a component of the railway system may package, or wrap, the incoming data packets according to a predetermined packaging standard. The component of the railway system then transfers and/or communicates the plurality of incoming data packets according to the transfer protocol.

The system 100 is configured to receive packets communicated according to the transfer protocol. Further, the system 100 is configured to interpret or unwrap packets packaged, or wrapped, according to the predetermined packaging standard. In this manner, the system 100 extracts the data elements from the first packet and then generates an outgoing data packet based on the data elements. The outgoing data packet includes a set of instructions based on the data elements. The outgoing data packet may also include operating instruction to control I/Os, a request to read an input in order to gather information, health message communications, a request for inter-process communication, or any other suitable instructions or elements. The set of instructions includes at least one instruction that instructs at least one of the safety critical hardware and software to execute a procedure.

For example, the set of instructions may instruct the safety critical software to execute a braking procedure. The braking procedure includes hardware braking instructions. The hardware braking instructions are communicated to the safety critical hardware. The safety critical hardware executes the braking instructions. For example, the safety critical hardware applies the brake.

The system 100 determines whether to communicate the outgoing data packet, including the data elements, to the safety critical hardware and software. For example, the system 100 ensures each of the plurality of incoming data packets meet a predetermined safety standard. The predetermined safety standard includes determining whether or not the railway system is operating in a safe manner. The system 100 verifies that each of the plurality of incoming data packets was validly or intentionally transferred by the railway system.

The railway system may communicate erroneous incoming data packets due to a hardware or software fault within the railway system. The system 100 is configured to ensure erroneously communicated data packets are not communicated to the safety critical hardware and software, and thus, the safety critical hardware and software are not operated according to the erroneous data packets. In other words, the system 100 ensures railway system and/or any other SAs and SCSs operate in a safe manner.

In one example, the safety critical hardware and software receives the first packet of the plurality of incoming data packets. The first packet is generated and communicated in response to a command from an operator of the railway system. The safety critical hardware and software receives a second packet of the plurality of incoming data packets due to a fault in the railway system. The fault in the railway system may include, by way of non-limiting example only, a hardware failure such as a deteriorated electrical connection due to extended exposure to heat or moisture.

The safety critical hardware and software communicate the plurality of incoming data packets, including the first and second packet, to the system 100. The system 100 is configured to determine whether each of the plurality of incoming data packets is a valid data packet or was received by the safety critical hardware and software as a result of a fault in the railway system.

When the system 100 determines one of the plurality of incoming data packets was received in response to a command from the operator (i.e., is a valid data packet), the system 100 generates an outgoing data packet corresponding to the received incoming data packet. For example, as described above, the system 100 generates a first outgoing data packet based on the first packet.

The first outgoing data packet includes a set of instructions corresponding to the data elements associated with the first packet. The system 100 communicates the first outgoing data packet to the safety critical hardware and software. The safety critical hardware and software then execute the set of instructions included in the first outgoing data packet. In this manner, the system 100 ensures the safety critical hardware and software only execute valid instructions and/or data elements.

Conversely, when the system 100 determines one of the plurality of incoming data packets was received in response to a fault within the railway system, the system 100 does not generate or communicate an outgoing data packet to the safety critical hardware and software. For example, the system 100 determines the second packet was received due to a fault in the railway system. The system 100 does not generate or communicate an outgoing data packet corresponding to the second packet to the safety critical hardware and software. Consequently, the safety critical hardware and software do not execute instructions corresponding to data elements included in the second packet.

Further, in response to the determination that a packet was received as a result of a fault, the system 100 generates a fault indication. The fault indication may include a fault signal as described in detail below. In this manner, data elements executed by the safety critical hardware and software are first verified as valid by the system 100. The validation ensures the railway system, for example, is operating in a safe manner.

In some implementations, validating a received packet includes the system 100 executing a voting procedure. For example, the system 100 receives a first packet of the plurality of incoming data packets and a second packet of the plurality of incoming data packets. In various embodiments, the first and second packets are intended to be copies, and voting is based upon the copies. The system 100 then votes on the first and second packet. Voting may include comparing the first packet to the second packet and determining whether the first and second packets are identical.

In some implementations, in response to a voting failure, the system 100 generates a safety indication. The safety indication indicates a failure has occurred within the system 100 or the safety critical hardware and software. Further, the system 100 instructs the at least one component to operate in a predetermined safe state in order to maintain the overall safety of the SAs and/or SCSs. The safe state may include the at least one component operating according to a set of safe state data elements configured to maintain a safe operating environment of the railway system.

The safe state data elements include instructing the SAs and or SCSs, such as the railway system, to operate in a manner that ensures the overall safety of the railway system. For example only, the railway system may bring a train operating on the railway system to a stop in response to the safe state data elements. Operating in the safe state may also include disabling all safety relevant communication interfaces. For example, a fail-safe computer operating in a safe state is incapable of communicating with the safety critical hardware and software. In this way, the fail-safe computer operating in the safe state is incapable of incorrectly instructing the safety critical hardware and software.

The system 100 includes an active fail-safe chassis (FSC) 104 and a standby FSC 108. In order to increase availability and reliability of the system 100, the active FSC 104 and the standby FSC 108 are redundant FSCs. For example, the active FSC 104 is configured to execute any and all operations of the standby FSC 108 in the same manner as the standby FSC 108. In this manner, when one of the active FSC 104 and the standby FSC 108 encounters a hardware or software failure, the other of the active FSC 104 and the standby FSC 108 can operate in place of the failed FSC.

The active FSC 104 implements a two-out-of-two (2oo2) voting architecture that detects voting mismatches and performs a failsafe operation when a voting mismatch occurs. The 2oo2 voting architecture includes dual redundant processing and voting subsystems. The redundant processing and voting subsystems vote on packets entering or leaving the active FSC 104. For example, the active FSC 104 receives a plurality of incoming data packets. In one example, the active FSC 104 receives two copies of a first packet of the plurality of incoming data packets.

The active FSC 104 determines the validity of the first packet by comparing the copies of the first and second packets as described above. In other words, the active FSC 104 votes on the first and second packets and copies of the first and second respective packets. The active FSC 104 continuously generates a first health status signal and a second health status signal based on the determination of whether the first packet is valid (i.e., voting was successful). In some implementations, continuously generating a signal may include setting the signal to a first predetermined value. The continuously generated signal is then maintained at the first predetermined value until the signal is de-asserted to a second predetermined value.

The active FSC 104 compares the two copies of the first packet. The active FSC 104 determines the first packet is valid when the two copies are identical. The active FSC 104 continuously generates the first health status signal and the second health status signal when the active FSC 104 determines the first packet is valid. The first and second health status signals may be asserted to a first value. For example, the first value is equal to 1. In another example, the first value may be a string of characters that indicate the FSC 104 is healthy.

Conversely, when the active FSC 104 determines the two copies of the first packet are not identical, the active FSC 104 de-asserts the first and second health status signals. De-asserting the first and second health status signals may include setting the first and second signals to a second value. For example, the second value may be equal to 0. In another example, the second value may be a string of characters that indicate the FSC 104 is not healthy. As will be described in greater detail below, the active FSC 104 includes a first processor and a second processor. The first processor continuously generates the first health status signal when the first processor determines that both copies of the first packet are valid. Similarly, the second processor continuously generates the second health status signal when the second processor determines that both copies of the first packet are valid.

As described above, the system 100 is a redundant system that includes the active FSC 104 and the standby FSC 108. In other words, the active FSC 104 and the standby FSC 108 operate in an identical fashion. In this manner, the standby FSC 108 is configured to determine whether two copies of the first packet are identical. For example, the standby FSC 108 receives two copies of the first packet. The standby FSC 108 compares the two copies of the first packet and generates a third and fourth health status signal based on the comparison. The third and fourth health status signals include features similar to the first and second health status signals. The system 100 monitors, as will be described in detail below, the first, second, third, and fourth health status signals and determines whether each of the active FSC 104 and the standby FSC 108 are healthy based on the health status signals.

In some implementations, the health status signals indicate whether the system 100, the active FSC 104, and/or the standby FSC 108 is in a testing mode. Periodically, the components of the system 100 may be tested to ensure the components of the system 100 are operating as they are intended to. One way to perform component testing is to take various components of the system 100 offline (i.e., to power down components or the entire system 100. However, it is advantageous to be able to test components of the system 100 while the system 100 is powered on.

In one example, the active FSC 104 may be instructed to perform one of a plurality of system tests to ensure the active FSC 104 is operating properly. By way of non-limiting example, the active FSC 104 may be instructed to simulate a fault in the system 100. Accordingly, when the active FSC 104 is operating properly, the active FSC 104 de-asserts the first and second health status signals in response to the simulated fault in the system 100.

As will be described in detail below, various components of the system 100 are configured to monitor the health status signals and operate according to whether or not the health status signals are asserted or de-asserted. For example, the active FSC 104 may assert the first and second health status signals in response determining a packet was validly generated, as described above. The system 100 is configured to instruct components of the SA and/or SCS to perform a task associated with a packet in response to the asserted first and second health status signals.

Similarly, the system 100 may instruct the standby FSC 108 to operate as an active FSC, in response to one of the first and second health signals being de-asserted. In other words, when the active FSC 104 de-asserts only one, or both in various embodiments, of the first and second health status signals, the system 100 determines that the active FSC 104 is unhealthy and instructs the standby FSC 108 to take over operation of the active FSC.

In the example implementation, the active FSC 104 may de-assert one or both of the first and second health signals in response to the simulated fault. In order to prevent the system 100 from operating in response to the first and second health signals being asserted and/or de-asserted during a component test (i.e., a simulated fault or other test that may result in erroneous health status signals), the health status signals may indicate whether or not the a test is being performed. For example, in various embodiments, the health status signals (i.e., the first-fourth health status signals) may be set to a value that indicates a test is to be performed by at least one component of the system 100.

In other examples, the health status signals may be set to a value comprising a character string that includes a first portion indicating a current health status of the active FSC 104 (and/or the standby FSC 108) and a second portion indicating whether or not a test is being performed. For example, as described above, the first and second health status signals may be set to a first value (i.e., indicating the active FSC 104 is healthy) or a second value (i.e., indicating the active FSC 104 is unhealthy). The first value may be a 17 bit character string. A first portion of the first value may be set to a predetermine character string indicating the current health status of the active FSC 104. For example only, when the active FSC 104 is healthy, the first 15 bits of the character string may be set to 1 (i.e., the first value). Alternatively, when the active FSC 104 is unhealthy, the first 15 bits of the character string may be set to 0 (i.e., the second value). It is understood that the character string may be any predetermined combination of suitable characters that correspond to a healthy or unhealthy status of the active FSC 104.

Additionally, the last two bits in the 17 bit character string may indicate whether to initiate a test on one or more components of the system 100. In one example, the active FSC 104 receives an instruction from the system 100 to simulate a fault as part of a component test. The active FSC 104 sets the last two bits of the character string to initiate 1 indicating a test. Conversely, the active FSC 104 sets the last two bits of the character string to 0 when the active FSC 104 is not to perform a test. In this manner, the first and second health status signals indicate a current health status of the active FSC 104 and whether or not the active FSC 104 should initiate a component test. It is understood that while only the active FSC 104 is described above, the principles disclosed herein apply to the standby FSC 108 and any other suitable components of the system 100.

The active FSC 104 communicates the first and second health status signals to the system 100. The system 100 monitors the first and second health status signal to determine whether the active FSC 104 is healthy. For example, when the first and second health status signals are set to the first value, the system 100 determines the active FSC 104 is healthy. Conversely, when the first health status signal and the second health status signal are de-asserted (i.e., set to the second value), the system 100 determines the active FSC 104 is not healthy. It is understood that while only voting mismatches are discussed in relation to the first and second status signals being de-asserted, any hardware or software failure within the system 100 may cause one of the first and second status signals to be de-asserted.

When the active FSC 104 determines that the two copies of the first packet are not identical, the active FSC 104 determines a voting mismatch has occurred. The active FSC 104 may generate a fault indication as described above. The fault indication may be a fault signal based on the voting mismatch. The voting mismatch may occur as a result of a fault in the system 100, an SA, and/or an SCSs. For example, the voting mismatch may be due to hardware or software failure within the system 100 or the railway system. For availability reasons, if the active FSC 104 encounters a hardware or software failure, the system 100 forces the active FSC 104 to a predetermined safe state. For example, the system 100 deactivates the active FSC 104. The standby FSC 108 then operates as the active FSC.

Each of the active FSC 104 and the standby FSC 108 may include a plurality of communication links. The communication links include, but are not limited to, uplinks, downlinks, and a user interface. An uplink is a bi-directional communication channel to higher-level equipment. The higher-level equipment may be system hardware included in overall system architecture. For example, the higher-level equipment may be components of the braking system described above.

A downlink is a bi-directional communication channel to lower-level hardware. For example, the lower-level hardware may include switches and relays that communicate with the higher-level equipment. The downlinks may be implemented following any suitable hardware standard. For example, the downlinks may be implemented as RS-232, RS-422, RS-485, CAN, MVB, Ethernet, Ethernet HSR Ring, or other suitable technology. A user interface is an interface designed to allow a user of the system 100 to access the components and subsystems of the system 100. For example only, the user interface may be implemented as a plurality of light emitting diodes (LEDs).

The communication links communicate with hardware and software components of an SA and/or SCS, such as the railway system. Further, the system 100 receives input and communicates output to a field engineer. For example, the field engineer may selectively configure the system 100 by communicating with the user interface of the system 100.

Each of the active FSC 104 and the standby FSC 108 includes a processing subsystem. The active FSC 104 processing subsystem includes a master central processing unit (CPU) 116a and a checker CPU 120a. Similarly, the standby FSC 108 processing subsystem includes a master CPU 116b and a checker CPU 120b. Each of the master CPUs 116a and 116b are configured to be identical. Similarly, each of the checker CPUs 120a and 120b are configured to be identical. In this way, the master CPU 116a, the master CPU 116b, the checker CPU 120*a*, and the checker CPU 120*b* act to increase the availability and reliability of the system 100.

In order to monitor and control the overall health and safety of the system 100, the master CPU 116*a* and the checker CPU 120*a* are also configured to be identical. For example, the master CPU 116*a* and the checker CPU 120*a* execute identical software and implement identical processing functions. The master CPU 116*a* and the checker CPU 120*a* are configured to perform identical functions in order to maintain full hardware fault and error detection coverage of the safety critical hardware and software and allow for voting on incoming data packets in the correct sequence.

In some implementations, the plurality of incoming data packets include requests to perform tasks communicated and/or generated by at least one of the safety critical hardware or software of the railway system. The request to perform a task is based on a command received by the safety critical hardware and software from the operator of the SAs and/or SCSs. For example, the operator of the railway system may command a train operating on the railway system to increase speed. The operator may actuate a physical lever within the train. The physical lever is configured to generate a signal indicative of the command to increase the speed of the train. The signal is communicated to the safety critical hardware and software.

Prior to executing the task, or tasks, the safety critical hardware and software communicate the task, in the form of an incoming data packet, to the system 100. The system 100 determines whether the task was validity generated. The system 100 determines the validity of a task by voting on the task as described above with respect to the plurality of incoming data packets. When the system 100 determines the task is valid, the system 100 generates an outgoing data packet based on the task, which in various embodiments, is voted on as well. The system 100 communicates the outgoing data packet to the safety critical hardware and software. The safety critical hardware and software executes the task in response to receiving the outgoing data packet.

In one implementation, the system 100 communicates the received packet associated with a requested task to the master CPU 116*a*. This may be referred to as a master packet. The system 100 communicates a copy of the received packet to the checker CPU 120*a*. This may be referred to as a checker packet. Both the master CPU 116*a* and the checker CPU 120*a* are configured to vote on the validity of the master and checker packets before the safety critical hardware and software execute the requested task associated with the packets.

Each of the master CPU 116*a* and the checker CPU 120*a* is configured to communicate a copy of the packet to the other of the master CPU 116*a* and the checker CPU 120*a*. In other words, the master CPU 116*a* receives the master packet from the system 100 and a copy of the checker packet from the checker CPU 120*a* Similarly, the checker CPU 120*a* receives the checker packet from the system 100 and a copy of the master packet from the master CPU 116*a* Prior to the master CPU 116*a* instructing the safety critical hardware and software to perform the requested task associated with the master packet, the master CPU 116*a* and the checker CPU 120*a* vote on the master and checker packets by comparing the master packet to the checker packet.

For example, the master CPU 116*a* compares the master packet to the copy of the checker packet. The master CPU 116*a* determines whether the master packet and the copy of the checker packet are identical. Similarly, the checker CPU 120*a* compares the checker packet to the copy of the master packet. The checker CPU 120*a* determines whether the checker packet and the copy of the master packet are identical.

When the master CPU 116*a* determines the master packet and the copy of the checker packet are identical, the master CPU 116*a* communicates the outgoing data packet to the safety critical hardware and software. Conversely, when the master CPU 116*a* determines the master packet and the copy of the checker packet are not identical, the master CPU 116*a* generates the fault indication as described above. The master CPU 116*a* may also de-assert the first and second health signals indicating the active FCS 104 is unhealthy. It is understood that while only the master CPU 116*a* is described, the principles of the present disclosure also apply to the checker CPU 120*a*.

The task associated with the outgoing data packet instructs the safety critical hardware and software to perform the requested task. The outgoing packet may include operating data elements to control I/Os, a request to read an input in order to gather information, health messages, a request for inter-process communication, or other suitable requests associated with the safety critical hardware and software. The operating data elements may include a set of instructions that instruct one of the safety critical hardware and software to execute a predetermined procedure. For example, the operating data elements may instruct the safety critical software to execute an acceleration procedure. The acceleration procedure includes controlling at least one safety critical hardware component. The at least one hardware component includes a throttle mechanism of the train, for example.

As described above, the fault indication may include a fault signal. The fault signal indicates a failure has occurred within the system 100, the safety critical hardware and software, or the SAs and/or SCSs. By voting on the master packet and the checker packet, the master CPU 116*a* verifies that the requested task is a valid request from a valid source (i.e., a component of an SA or an SCS, such as the railway system) and not an erroneous request.

For example only, the voting mismatch may be a result of an erroneous request received by the master CPU 116*a*. The master CPU 116*a* may receive erroneous requests to perform tasks due to a hardware failure, a software error, or an overall system malfunction. By way of non-limiting example, the master CPU 116*a* may receive a request to apply the brake in response to a short in an electrical component associated with the brake. It is understood that while only the master CPU 116*a* and the checker CPU 120*a* are described, the principles described above also apply to the master CPU 116*b* and the checker CPU 120*b*.

Each of the active FSC 104 and the standby FSC 108 include a plurality of input/output unit (IOU) modules. The active FSC 104 includes IOU modules 128*a*-128*f*. The IOU modules 128*a*-128*f* will hereinafter be referred to as the IOU module 128. Similarly, the standby FSC 108 includes IOU modules 132*a*-132*f*, which are identical to the IOU modules 128*a*-128*f*. The IOU modules 132*a*-132*f* will hereinafter be referred to as the IOU module 132.

The active FSC 104 and the standby FSC 108 also each include a switch module 124*a* and a switch module 124*b* respectively. The switch module 124*a* and the switch module 124*b* are configured to operate identically. The switch module 124*a* and the switch module 124*b* receive the plurality of incoming data packets from the I/O subsystem and route the packets to the master CPUs 116*a* and 116*b* and the checker CPUs 120*a* and 120*b*.

The switch module 124a also routes packets received from the master CPU 116a to one or more components of an SA and/or SCS, such as the railway system. For example, as described above, the master CPU 116a generates outgoing data packets. The master CPU 116a communicates the outgoing data packets to the switch module 124a. The switch module 124a then routes the outgoing data packet to one or more components within the system 100, an SA, or an SCS. Accordingly, the switch module 124a routes outgoing data packets to components of the railway system, such as the safety critical hardware and software. It should be appreciated that while only the switch module 124a is described, the principles described above also apply to the switch module 124b.

The IOU module 128 implements the I/O subsystem within the active FSC 104. The I/O system is configured to provide a gateway between lower-level network equipment and the master CPU 116a and the checker CPU 120a. The IOU module 128 isolates the master CPU 116a and the checker CPU 120a from low level protocols required by external hardware and software. In this way, the IOU module 128 adds a safety layer on the internal Ethernet to support safe communication between the master CPU 116a, checker CPU 120a, and the safety critical hardware and software. The IOU module 128 and the switch module 124a may be referred to collectively as front blades 124a-128f. Similarly, the IOU module 132 and the switch module 124b may be referred to collectively as the front blades 124b-132f.

The active FSC 104 and the standby FSC 108 also include a plurality of rear transition modules (RTMs). The active FSC 104 includes RTMs 136a-136i. The standby FSC 108 includes RTMs 140a-140i. It should be appreciated that because the standby FSC 108 is a redundant configuration of the active FSC 104, the RTMs 136a-136i are identical to the RTMs 140a-140i. In some implementations, each of the RTMs 136a-136i may be hot swappable field replaceable units (FRUs).

For example, each of the RTMs 136a-136i may be removed and replaced by a field engineer without first having to power off the entire system 100. The RTMs 136a-136i allows the active FSC 104 to communicate with the safety critical hardware and software components. For example, the RTM 136a electrically and logically couples the master CPU 116a to components of the railway system. Similarly, the RTM 136b electrically and logically couples the standby FSC 108 to safety critical hardware and software components.

The front blades 124a-128f and master CPU 116a and checker CPU 120a each includes a first memory location and a second memory location. The first and second memory locations store a value received from a corresponding hardware component of the active FSC 104. For example, the master CPU 116a continuously generates a module health signal (described above) indicative of the module health of the master CPU 116a. The master CPU 116a stores a 1 in the first memory location when the module health signal indicates the master CPU 116a is healthy.

Each of the front blades 124a-128f and the master CPU 116a and CPU 120a generates a module health signal. Each of the front blades 124a-128f stores a value indicative of the module health signal in a first memory location. For example only, the switch module 124a stores a 1 in a first memory location associated with switch module 124a when the module health signal indicates the switch module 124a is healthy.

Conversely, the switch module 124a stores a 0 in the first memory location when the module health signal indicates the switch module 124a is not healthy. It is understood that while only the switch module 124a is described, the principles discussed herein apply to all modules within the system 100 It is further understood that while only storing a 1 and 0 based on the module health signal are described, any suitable indicator may be used to indicate the health of each of the modules within the system 100. Each of the modules within the system 100 then communicates the value stored in the associated first memory location to the master CPU 116a.

The master CPU 116a determines whether the active FSC 104 is healthy based on a plurality of values corresponding to the module health signals generated by each of the front blades 124a-128f and a module health signal generated by the master CPU 116a. For example only, the master CPU 116a determines that the active FSC 104 is healthy when each of the received values corresponding to the module health signals indicates that each of the modules within the system 100 is healthy. Conversely, the master CPU 116a determines that the active FSC 104 is not healthy when at least one of the received values corresponding to the module health signals indicates that at least one of the modules within the system 100 is not healthy.

In some implementations, the RTMs 136a and 136b communicate a chassis health value to a safety relay box module 144. The safety relay box module 144 selectively determines which of FSCs within the system 100 will be the active FSC and which will be the standby FSC based on a plurality of chassis health values. For example, the safety relay box module 144 receives a plurality of chassis health values from the RTM 136a, RTM 136b, RTM 140a, and RTM 140b. The RTM 136a generates a first chassis health value based on the cumulative result of the module health signals generated by the master CPU 116a and the front blades 124a-128f.

The RTM 136a communicates the chassis health value to the safety relay box module 144. Similarly, the RTM 136b generates a second chassis health value based the cumulative result of the module health signals generated by the checker CPU 120a and the front blades 124a-128f. The RTM 140a generates a third chassis health value based on the cumulative result of the module health signals generated by the master CPU 116b and the front blades 124b-132f. Similarly, the RTM 140b generates a fourth chassis health value based on the cumulative result of the module health signals generated by the checker CPU 120b and the front blades 124b-132f.

The safety relay box module 144 determines which of the active FSC 104 and the standby FSC 108 will operate as an active FSC within the system 100. For example, the safety relay box module 144 determines the active FSC 104 will operate as the active FSC within the system 100 based the first-fourth chassis health values. The safety relay box module 144 determines the active FSC 104 will be the active FSC within the system 100 when the first and second chassis health signals indicate the active FSC 104 is healthy.

The safety relay box module 144 generates an active FSC signal and a standby FSC signal based on the active FSC determination. For example, the safety relay box module 144 generates a first active FSC signal and a second active FSC signal. The first and second active FSC signals are redundant signals that are both indicative of which FSC is elected to operate as the active FSC. The safety relay box module 144 also generates a first standby FSC signal and a second standby FSC signal.

The first and second standby FSC signals are redundant signals that are both indicative of which FSC was elected to operate as the standby FSC. The safety relay box module 144 communicates the first active FSC signal and the first standby FSC signal to the active FSC 104. Similarly, the safety relay box module communicates the second active FSC signal and the second standby FSC signal to the standby FSC 108.

The safety relay box module 144 also determines whether a fault has occurred in one of the active FSC 104 and the standby FSC 108 based on first-fourth chassis health signals. For example, the safety relay box module 144 determines a fault has occurred in the active FSC 104 when the safety relay box module 144 receives an invalid chassis health signal from one of the RTMs 136a and 136b. For example, an invalid chassis health signal may be a chassis health value of 0. The safety relay box module 144 generates a standby signal based on the invalid chassis health signal. The safety relay box module 144 communicates the standby signal to the active FSC 104. The active FSC 104 determines whether to enter a failsafe state based on the standby signal. For example, the active FSC 104 determines to enter the failsafe state when the active FSC 104 receives the standby signal.

The safety relay box module 144 generates an active signal based on the chassis health value. The safety relay box module 144 communicates the active signal to the standby FSC 108. The active signal indicates to the standby FSC 108 that the active FSC 104 is operating in the failsafe state or standby state. When the standby FSC 108 receives the active signal, the standby FSC 108 begins operating as the active FSC. In this way, the safety relay box module 144 forces a failed active FSC into a failsafe state, and alerts a standby FSC to assume the role of active FSC.

The safety relay box module 144 is configured to receive and interpret signals and messages from the active FSC 104 and the standby FSC 108 according to the communication protocol. In this way, the safety relay box module 144 communicates with the active FSC 104 and the standby FSC 108 regardless of the physical characteristics of the active FSC 104 and the standby FSC 108 so long as the active FSC 104 and the standby FSC 108 follow the communication protocol. It is understood that the safety relay box module 144 communicates with any component within the system 100.

Figure 2:
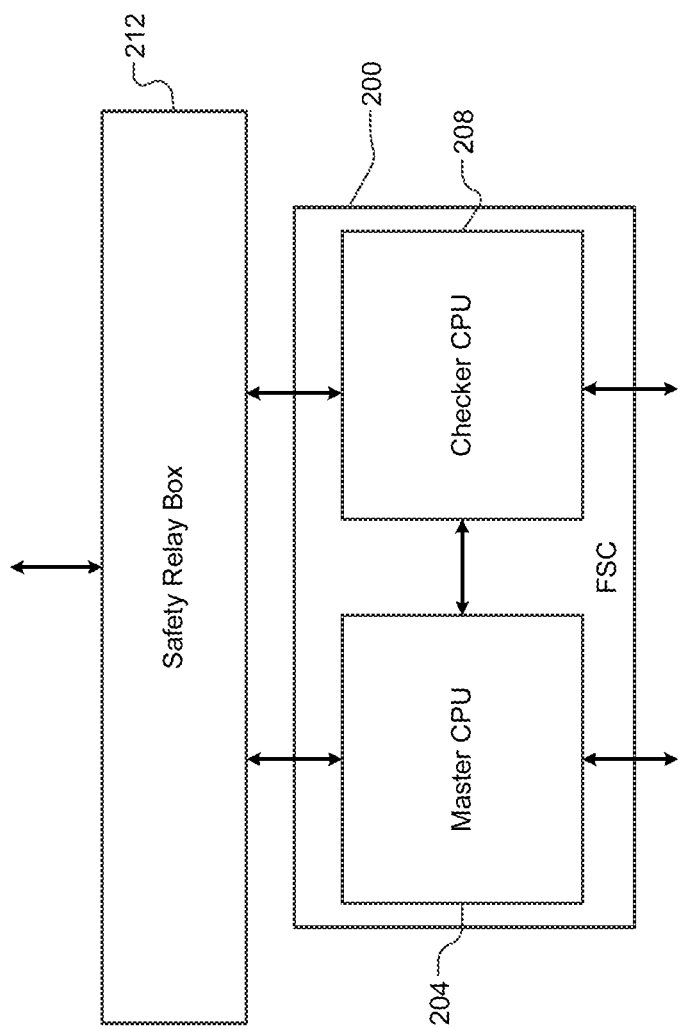
FIG. 2 is a functional block diagram of a fail-safe chassis according to the principles of the present disclosure.

Referring now to FIG. 2 a block diagram of an exemplary fail-safe chassis (FSC) according to the principles of the present disclosure is shown at 200. The FSC 200 includes a master CPU 204 and a checker CPU 208. The master CPU 204 and the checker CPU 208 execute identical software and implement identical processing functions. The master CPU 204 and the checker CPU 208 are configured to perform identical functions in order to maintain full hardware fault and error detection coverage of safety critical hardware and software.

For example, the master CPU 204 receives a request to perform a task from at least one of the safety critical hardware or software of an SA and/or SCS, such as the railway system described above. The railway system includes a plurality of safety relevant components including safety critical hardware and software. The safety critical hardware and software interact with components of the railway system in order to control aspects of the railway system. For example, the safety critical hardware and software controls operation of a train operating within the railway system.

The request to perform a task may include, but is not limited to, determining a status of a hardware component, engaging a brake of the railway system, or indicating to an operator of the railway system a location of a train operating within the railway system. The request to perform a task is received in the form of a packet. For example, the request to perform a task may be one of the plurality of incoming data packets.

Simultaneously, the checker CPU 208 receives a copy of the same request. Each of the master CPU 204 and the checker CPU 208 is configured to communicate a copy of the requested task to the other of the master CPU 204 and the checker 208. Prior to the master CPU 204 performing the requested task, the master CPU 204 and the checker CPU 208 compare the requested task received by each of the master CPU 204 and the checker CPU 208.

When the requested tasks are identical, the master CPU 204 and the checker CPU 208 communicate the requested task to the safety critical hardware and software for processing. For example, the master CPU 204 and the checker CPU 208 generates an outgoing packet associated with the requested task. The outgoing packet includes operating data elements. The operating data elements may include a set of instructions that instruct one of the safety critical hardware and software to execute a predetermined procedure. For example, the operating data elements may instruct the safety critical software to execute a brake engaging procedure. The brake engaging procedure includes controlling at least one safety critical hardware component. The at least one hardware component may include a brake mechanism of the railway system.

Conversely, when the requested tasks are not identical, the master CPU 204 and the checker CPU 208 do not communicate the requested task to the safety critical hardware and software. In this way, the master CPU 204 verifies that the requested task is a valid request from a valid source (i.e., an external hardware component or software application) and not an erroneous request to perform tasks generated due to external hardware failures, a software error, or an overall system malfunction.

The master CPU 204 and checker CPU 208 each continuously generate a module health signal based on a determination of whether the requested tasks are identical. When the master CPU 204 and the checker CPU 208 determine the requested tasks are identical, the master CPU 204 and the checker CPU 208 continuously generate the module health signal. When the master CPU 204 and the checker CPU 208 determine the requested tasks are not identical, the master CPU 204 and the checker CPU 208 de-assert the module health signal. In some examples, the master CPU 204 determines the tasks are identical and continuously generates a first module health signal while the checker CPU 208 determines the tasks are not identical and de-asserts a second module health signal. As will be described in detail below, only one of the first and second module health signals being asserted is indicative of a component failure.

The master CPU 204 and the checker CPU 208 generate a chassis health signal based on a plurality of module health signals generated by each of a plurality of modules associated with the FSC 200. The FSC 200 includes similar features as those described with respect to the active FSC 104. For example, the FSC 200 includes the front blades 124a-128f as described above. Each of the modules within the FSC 200 continuously generates a module health signal (as described above). The master CPU 204 generates a first chassis health signal when the plurality of module health signals indicates the FSC 200 is healthy. In other words, the first chassis health signal is continuously asserted (i.e., set to 1) when the plurality of module health signals indicate the FSC 200 is healthy.

It is understood that principles described with respect to the master CPU 204 apply to the checker CPU 208. The checker CPU 208 generates a second chassis health signal based on a plurality of module health signals generated by each of a plurality of modules associated with the FSC 200. The checker CPU 208 continuously generates the second chassis health signal when the plurality of module health signals indicates the FSC 200 is healthy. The master CPU 204 communicates a first chassis health signal to a safety relay box 212. Similarly, the checker CPU 208 communicates a second chassis health signal to a safety relay box 212.

In one implementation, the first and second chassis health signals indicate whether or not a component within the system 100 should perform a test, as described above. For example, each of the module health signals generated by the master CPU 204 and the checker CPU 208 includes a first portion that indicates a current module health of the respective CPU and a second portion that indicates whether a component within the system 100 should perform a test. As described above, this may include setting each of the module health signals to a 17 bit character string. The first portion of the 17 bit character string may comprise one or more of the 17 bits while the second portion of the 17 bit character string comprises the remaining bits of the 17 bits.

By way of non-limiting example only, the first portion may comprise 15 bits while the second portion may comprise two bits. The first portion may be set to a predetermined value indicating whether the respective module associated with the module health signal is health. For example, the 17 bit character string may be a binary character string. When the module associated with the module health signal is healthy, the first portion may be set to a predetermined sequence of 1s and 0s. Conversely, when the module associated with the module health signal is unhealthy, the first portion may be set to a different predetermined sequence of 1s and 0s. It is understood that the 17 bit character string may be any suitable base system, including binary, hexadecimal, or any suitable number and/or character base.

Continuing with the above example, the second portion may comprise the remaining two bits of the 17 bit character string. When the module associated with the module health signal to perform a test, the second portion may be set to a predetermined value indicating the module is to perform a test. The value may be a predetermined sequence of 1s and 0s when the 17 bit character string is a binary number. As described above, the character string may be any number base or character set. Conversely, when the module associated with the module health signal does not receive an instruction to perform a test, the second portion is set to a value indicating the module is not to perform a test. In this manner, other components of the system 100 will ignore or react to the module health signal based on whether or not the module is performing a test.

As an example, the master CPU 204 receives an instruction to simulate a fault in the FSC 200. The master CPU 204 simulates the fault and generates the first module health signal. The first portion of the first module health signal indicates that the master CPU 204 is unhealthy and the second portion of the first module health signal indicates the master CPU 204 is to perform a test. Further, any module within the system 100 may generate a module health signal that indicates a health status of the corresponding module.

The safety relay box module 212 selectively determines whether the FSC 200 will operate as an active FSC based on a plurality of chassis health signals. For example, the safety relay box module 212 begins receiving a chassis health signal from the master CPU 204 when the FSC 200 is initiated. The safety relay box module 212 also begins receiving a chassis health signal from the checker CPU 208. As described above, the chassis health signals are based on each of the individual module health signals. For example, if all individual module health signals indicate each corresponding module is healthy, the master CPU 204 generates a first chassis health signal indicating the modules associated with the master CPU 204 are healthy. Conversely, if one or more of the module health signals indicates that one or more of the corresponding modules are unhealthy, the master CPU 204 de-asserts the first chassis health signal indicating that FSC 200 is unhealthy.

As described above, each of the module health signals may include a portion that indicates whether a corresponding module is to perform a test. As such, when the master CPU 204 receives a module health signal, the master CPU 204 is configured to determine whether the corresponding module is to perform a test based on the module health signal. For example, the master CPU 204 determines whether the second portion of the module health signal indicates that the corresponding module is to perform a test. When the master CPU 204 determines the corresponding module is to perform a test, the master CPU 204 ignores the module health signal and generates the first chassis health signal based on the remaining received module health signals. In other words, a module health signal sent from a module being tested is capable of affecting whether or not the master CPU 204 will assert or de-assert the first chassis health signal. The safety relay box module 212 determines whether the FSC 200 will be elected as the active FSC based on the chassis health signals.

In some implementations, the safety relay box module 212 also receives a plurality of chassis health signal from another FSC. The safety relay box module 212 determines whether the FSC 200 or the other FSC will be elected as the active FSC based on the plurality of chassis health signal. For example, the safety relay box module 212 first determines whether one of the FSC 200 or the other FSC is healthy. The safety relay box module 212 determines the FSC 200 is healthy when the chassis health signals received from the FSC 200 indicate the FSC 200 is healthy. For example, the safety relay box 212 determines the FSC 200 is healthy when the safety relay box 212 receives a chassis health signal from the FSC 200.

Similarly, the safety relay box module 212 determines the other FSC is healthy when the plurality of chassis health signals received from the other FSC indicate the other FSC is healthy. When safety relay box module 212 determines that both of the FSC 200 and the other FSC are healthy, the safety relay box module 212 elects an active FSC based on which of the FSC 200 and the other FSC communicated one of the plurality of chassis health signals first. For example, when the FSC 200 communicates a signal to the safety relay box module 212 before the other FSC communicates a signal to the safety relay box module 212, the safety relay box module 212 elects the FSC 200 as the active FSC.

The safety relay box module 212 monitors the health of the active FSC. For example, the safety relay box module 212 receives the first and second chassis health signals from the FSC 200. The safety relay box module 212 determines whether a fault has occurred in the FSC 200 based on the first and second chassis health signals. The safety relay box 212 determines a fault has occurred in the FSC 200 when at least one of the first and second chassis health signals is indicative of a voting mismatch of the requested tasks. In other words, the safety relay box module 212 determines a fault has occurred when the safety relay box module 212 does not receive one of the first and second chassis health signal (i.e., one of the first and second chassis health signals is de-asserted as described above).

As described above, each of the module health signals may include a portion that indicates whether a module is to perform a test, and therefore, the relative health indicated by the module health signal can affect a chassis health determination. Similarly, each of the chassis health signals may include a portion that indicates that the master CPU 204 and/or the checker CPU 208 are performing a test. For example, the master CPU 204 may receive an instruction to simulate a fault that would generate a chassis health signal that indicates the master CPU 204 is unhealthy. The safety relay box module 212 is configured to determine whether the chassis health signal is indicative of the master CPU 204 (or checker CPU 208) is performing a test. As described above, this may include determining whether a first portion of the chassis health signal indicates a health status and a second portion indicates a test is to be performed.

When the safety relay box module 212 determines, based on a value of the second portion of the chassis health signal, that the master CPU 204 is to perform a test, the safety relay box module 212 can affect the health status associated with the chassis health signal. In this manner, in various embodiments, the safety relay box module 212 will determine if the master CPU 204 can affect the health determination of FSC 200.

The safety relay box module 212 generates a failsafe signal when the safety relay box module 212 determines a fault has occurred in the FSC 200. For example, the first portion of one of the first and second chassis health signals indicates an unhealthy status and the second portion of the corresponding one of the first and second chassis health signals indicates that a test is not being conducted. The safety relay box module 212 communicates the failsafe signal to the FSC 200. The FSC 200 determines whether to enter the safe state based on the failsafe signal. For example, the FSC 200 enters the safe state when the FSC 200 receives the failsafe signal. Conversely, the FSC 200 will continue to operate in the active FSC mode unless the FSC 200 receives a failsafe signal.

Alternatively, the FSC 200 may enter a standby state when the FSC 200 does not receive an active signal. The safety relay box module 212 communicates the active signal when the safety relay box module 212 determines the FSC 200 is to operate as the active FSC. The safety relay box module 212 continuously communicates the active signal to the FSC 200. When the safety relay box module 212 determines the FSC 200 is faulty, the safety relay box module 212 does not communicate an active signal to the FSC 200. The FSC 200 then operates in the standby state.

In some implementations, the plurality of chassis health signals are implemented as dynamic pulse signals to eliminate undetected, latent failure modes. The safety relay box module 212 is configured to determine whether a pulse signal is stuck at 0 or stuck at 1. For example, the safety relay box 212 receives a first pulse signal from the master CPU 204. The safety relay box module 212 is configured to wait a predetermined period of time.

For example, the predetermined period of time may be a period corresponding to a time long enough for a dynamic pulse to reset. The safety relay box module 212 determines the first pulse signal is stuck when the first pulse signal has not been reset after the predetermined period. The safety relay box module 212 determines a fault occurred in the master CPU 204 when the safety relay box module 212 determines the first pulse signal is stuck. The safety relay box module 212 generates a failsafe signal based on determining a fault in the master CPU 204.

Figure 3:
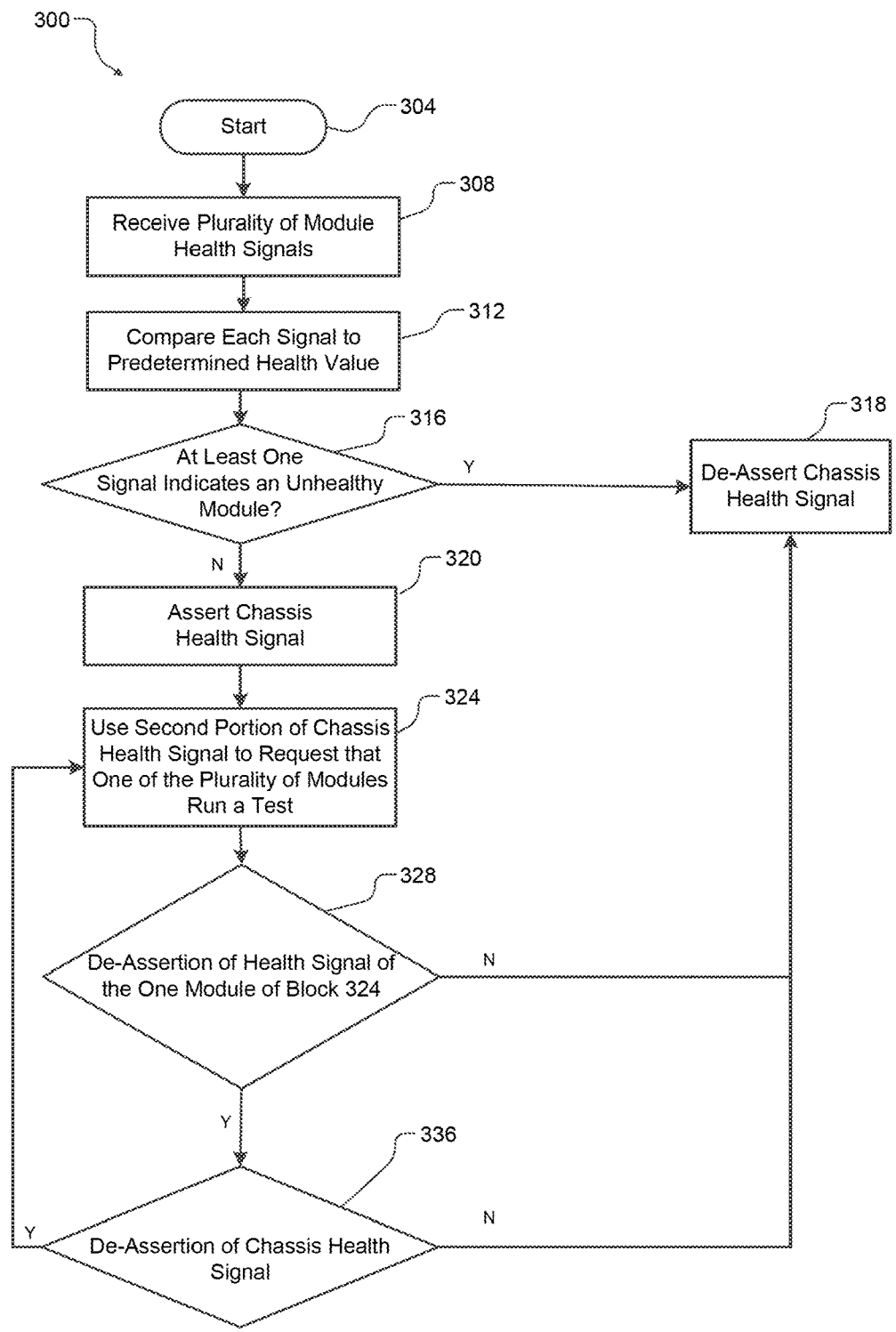
FIG. 3 is a flow diagram illustrating a fault-tolerant failsafe computer operating method according to the principles of the present disclosure.

Referring now to FIG. 3 a method 300 for implementing a fault-tolerant failsafe computer system including end to end FSC diagnostics begins at 304. At 308, the method 300 receives a plurality of module health signals. For example, as described above, the master CPU 204 receives a plurality of module health signals from each of the modules in the system 100. At 312, the method 300 compares at least a portion of each of the module health signals to a predetermined value that indicates whether or not a corresponding module is healthy.

At 316, the method 300 determines whether one or more of the module health signals indicate that one or more of the modules associated with the system 100 is unhealthy, based on the comparison at 312. If true, the method continues at 318. If false, the method 300 continues at 320. At 320, the method 300 asserts a chassis health signals. In various embodiments, the chassis health signal can indicate that one or a plurality of corresponding modules is to perform a test. For example, the master CPU 204 uses the module health signals to determine if the module is being tested can affect the chassis health determination.

At 324, the method 300 uses a second portion of the chassis health signals to request that one of the plurality of modules run a test. For example, the master CPU 204 compares the first portion of each of the module health signals to a predetermined health value that indicates the corresponding module is healthy. At 328, the method 300 determines whether the one module from 324 de-asserts the module health signal. In various embodiments, the de-assertion may be brief.

If no de-assertion of the health signal of the module is detected, the method proceeds to 318 in which the chassis health signal is de-asserted indicating an unhealthy module within the chassis. At 318, the method 300 de-asserts a chassis health signal indicating that at least one module in the system 100 is unhealthy. If 328 detects a de-assertion of the healthy signal of the one module of block 324, the method 300 continues at 336. At 336, the method 300 determines if the chassis health signal has been de-asserted. In various embodiments, the de-assertion may be brief. If no de-assertion has been detected, method 300 proceeds to 324. If a de-assertion has not been detected, method 300 proceeds to 318.

In view of the foregoing, health and safety status is indicated by the sending and receiving of a dynamic pulsed signal of a specific length. A signal not varying from high or low would be seen as a fault. These signals are generated by various voting and control FPGAs within the system. If a bit or bits that determine that a health signal should be generated should become unvarying, an incorrect health signal could be generated by that device. Over time, if more than one device arrives at this condition, a safety issue could occur. By extending the health and safety signal such that a test signal can be indicated within the pattern, all boards receiving the pattern would know that a test is occurring. There are redundant channels so if an actual error occurs, it can be detected by the other channel. This allows a test to flip the inputs to FPGAs to ensure that an incorrect health signal indication actually occurs, as well as making sure all the FPGAs in that channel also see this test indication as well. This ensures they are processing items internally to the FPGA correctly as well.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MAT-LAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
   a first fail-safe chassis (FSC) that:
   receives a plurality of module health signals from a plurality of associated modules and continuously generates a chassis health signal including a first portion indicating the health of the chassis and a second portion indicating a test request a plurality of modules in the system that each receive the chassis health signal;
   determines whether one or more of the module health signals indicates that an associated module is unhealthy based on a first comparison between each of the module health signals and a predetermined health value; and
   selectively de-asserts first chassis health signal based on the first comparison;
   a second FSC that:
   receives a plurality of module health signals from a plurality of associated modules and continuously generates a second chassis health signal that contains a first portion indicating the health of the chassis and a second portion indicating a test request, a plurality of modules in the system each receive the chassis health signal;
   determines whether one or more of the module health signals indicates that an associated module is unhealthy based on a second comparison between the module health signals and the predetermined health value;
   selectively de-asserts first chassis health signal based on the second comparison; and
   a safety relay box module that determines whether to instruct the first FSC to operate in a predetermined mode based on the chassis health signal and the second chassis health signal.

2. The system of claim 1 wherein one of the plurality of modules begins a test based on a third comparison of the second portion of the chassis health signal and a predetermined test request value determined in accordance with the one of the plurality of modules.

3. The system of claim 2 wherein the module health signal associated with a selected one of the plurality of modules instructed to run the test will de-assert its module health as a result of that test.

4. The system of claim 3 wherein the chassis health signal is de-asserted in accordance with result of that test.

5. The system of claim 4 wherein if the module health signal is not de-asserted and the chassis health signal is not de-asserted, the FSC will de-assert the chassis health signal.

6. The system of claim 1 wherein the first FSC includes a master CPU that receives a first copy of a data packet and a checker CPU that receives a second copy of the data packet.

7. The system of claim 6 wherein the master CPU communicates the first copy of the data packet to the checker CPU and wherein the checker CPU communicates the second copy of the data packet to the master CPU.

8. The system of claim 7 wherein a master CPU selectively de-asserts a first module health signal based on a first comparison between the first copy of the data packet and the second copy of the data packet and wherein the checker CPU selectively de-asserts a second module health signal based on a second comparison between the second copy of the data packet and the first copy of the data packet.

9. The system of claim 8 wherein the master CPU de-asserts the first module health signal when the master CPU determines the first copy of the data packet is not identical to the second copy of the data packet.

10. The system of claim 8 wherein the checker CPU de-asserts the second module health signal when the checker CPU determines the second copy of the data packet is not identical to the first copy of the data packet.

11. The system of claim 3 wherein the chassis health signal includes a first portion that indicates a current health of the FSC and a second portion that indicates whether to perform a test of a predetermined module.

12. The system of claim 1 wherein the FSC de-asserts the chassis health signal when a first module health signal is not equal to the predetermined health value.

13. The system of claim 1 wherein the FSC de-asserts the chassis health signal when a second module health signal is not equal to the predetermined health value.

14. A method comprising:
   receiving, by a fail-safe chassis (FSC) that generates a chassis health signal, a plurality of module health signals from a plurality of associated modules, wherein the chassis health signal includes a first portion indicating the health of the chassis and a second portion indicating a test request and wherein the FSC inserts a test request onto the chassis health signal;
   determining whether one or more of the module health signals indicates that an associated module is unhealthy based on the first comparison between each of the module health signals and a predetermined health value;
   de-asserting the chassis health signal based on the first comparison; and
   determining, by a safety relay box, whether to instruct the FSC to operate in a predetermined mode based on the chassis health signal and another chassis health signal.

15. The method of claim 14 further comprising receiving, at a master CPU associated with the FSC, a first copy of a data packet and receiving, at a checker CPU associated with the FSC, a second copy of the data packet.

16. The method of claim 15 further comprising communicating the first copy of the data packet to the checker CPU and the second copy of the data packet to the master CPU.

17. The method of claim 16 further comprising selectively de-asserting a first module health signal based on a first comparison between the first copy of the data packet and the second copy of the data packet and selectively de-asserting a second module health signal based on a second comparison between the second copy of the data packet and the first copy of the data packet.

18. The method of claim 17 further comprising de-asserting the first module health signal when the first copy of the data packet is not identical to the second copy of the data packet.

19. The method of claim 17 further comprising de-asserting the second module health signal when the second copy of the data packet is not identical to the first copy of the data packet.

20. The method of claim 16 further comprising indicating, by a first module health signal, a current health of the master CPU, and indicating, by a second module health signal, a current health of the checker CPU.

21. The method of claim 20 further comprising de-asserting the chassis health signal when the first module health signal is not equal to the predetermined health value.

22. The method of claim 21 further comprising de-asserting the chassis health signal when the second module health signal is not equal to the predetermined health value.

23. The method of claim 22 where each of the plurality of modules within the FSC compares the second portion of the chassis health signal to a test request pattern determined in accordance with a respective one of the plurality of modules module.

24. The method of claim 21, wherein, the module runs a test resulting in a de-assertion of its module health signal based on the first comparison.

25. The method of claim 22 where the FSC de-asserts its chassis health signal if the de-assertion of module health does not occur.

26. The method of claim 22 where the FSC de-asserts its chassis health signal if the de-assertion of module health does not occur.

27. The method of claim 22 wherein the de-assertion is brief.

* * * * *